(12) United States Patent
Semersky et al.

(10) Patent No.: US 8,124,203 B2
(45) Date of Patent: Feb. 28, 2012

(54) CONTAINER HAVING A FOAMED WALL

(75) Inventors: Frank E. Semersky, Holland, OH (US); William D. Voyles, Toledo, OH (US)

(73) Assignee: Plastic Technologies, Inc., Holland, OH (US)

( * ) Notice: Subject to any disclaimer, the term of this patent is extended or adjusted under 35 U.S.C. 154(b) by 137 days.

(21) Appl. No.: 12/536,768

(22) Filed: Aug. 6, 2009

(65) Prior Publication Data

US 2009/0297748 A1    Dec. 3, 2009

Related U.S. Application Data

(63) Continuation-in-part of application No. 11/015,360, filed on Dec. 17, 2004, and a continuation-in-part of application No. 10/684,611, filed on Oct. 14, 2003, now Pat. No. 7,588,810.

(60) Provisional application No. 60/545,049, filed on Feb. 17, 2004, provisional application No. 60/422,223, filed on Oct. 30, 2002.

(51) Int. Cl.
*B32B 1/02* (2006.01)

(52) U.S. Cl. ............... 428/36.5; 428/36.9; 428/36.91; 428/316.6; 428/319.3; 428/319.7

(58) Field of Classification Search .......... 428/36.5, 428/316.6, 317.9, 319.3, 319.7, 36.9, 36.91
See application file for complete search history.

(56) References Cited

U.S. PATENT DOCUMENTS

| | | | |
|---|---|---|---|
| 3,419,455 A | 12/1968 | Roberts | |
| 3,684,633 A | 8/1972 | Haase | |
| 4,338,068 A | 7/1982 | Suh et al. | |
| 4,473,665 A | 9/1984 | Martini-Vvedensky et al. | |
| 4,533,578 A | 8/1985 | Boyd et al. | |
| 4,548,773 A | 10/1985 | Suh et al. | |
| 4,872,573 A | 10/1989 | Johnson et al. | |
| 4,923,723 A | 5/1990 | Collette et al. | |
| 5,149,579 A | 9/1992 | Park et al. | |
| 5,215,691 A | 6/1993 | Bland et al. | |
| 5,223,545 A | 6/1993 | Kumar | |
| 5,334,356 A | 8/1994 | Baldwin et al. | |
| 5,656,719 A | 8/1997 | Stibal et al. | |
| 5,866,053 A | 2/1999 | Part et al. | |
| 5,919,547 A | 7/1999 | Kocher et al. | |
| 5,927,525 A | 7/1999 | Darr et al. | |
| 6,051,174 A | 4/2000 | Park et al. | |
| 6,223,945 B1 | 5/2001 | Giblin et al. | |
| 6,358,446 B1 | 3/2002 | Clarke | |
| 6,485,819 B2 | 11/2002 | Hayes | |
| 7,588,810 B2 * | 9/2009 | Semersky | 428/36.5 |
| 2004/0012107 A1 | 1/2004 | Xu et al. | |
| 2004/0086703 A1 | 5/2004 | Semersky | |
| 2006/0073298 A1 | 4/2006 | Hutchinson et al. | |
| 2008/0254245 A1 * | 10/2008 | Penescu et al. | 428/36.7 |
| 2009/0026198 A1 | 1/2009 | Ichikawa et al. | |
| 2009/0297748 A1 | 12/2009 | Semersky et al. | |
| 2010/0000957 A1 | 1/2010 | Hutchinson et al. | |

* cited by examiner

*Primary Examiner* — Hai Vo
(74) *Attorney, Agent, or Firm* — Fraser Clemens Martin & Miller LLC; J. Douglas Miller

(57) ABSTRACT

A multi-layer preform having at least one foamed layer suitable for forming a multi-layer blow molded container having at least one foamed layer container is disclosed, the multi-layer container formed by a process comprising the steps of injection molding a polymer melt having a non-reactive gas entrained therein, causing entrained gas cells in the polymer melt to open to form a polymer preform having an open cell foam layer, cooling the preform to a temperature below the polymer softening temperature, reheating the preform to a temperature greater than the polymer softening temperature, and blow molding the preform in a second mold, to prepare the container. At least one layer of the container may be blended with an oxygen and/or carbon dioxide barrier material.

14 Claims, No Drawings

CONTAINER HAVING A FOAMED WALL

CROSS-REFERENCE TO RELATED APPLICATION

This application is a continuation-in-part of U.S. patent application Ser. No. 11/015,360 filed on Dec. 17, 2004, which claims the benefit of U.S. Provisional Patent Application Ser. No. 60/545,049, filed on Feb. 17, 2004, and a continuation-in-part of U.S. patent application Ser. No. 10/684,611 filed Oct. 14, 2003, which claims the benefit of U.S. Provisional Patent Application Ser. No. 60/422,223, filed on Oct. 30, 2002.

FIELD OF THE INVENTION

The present invention relates generally to a plastic container having a foam layer. More particularly, the invention is directed to a multi-layered plastic container including at least one layer of foam.

BACKGROUND OF THE INVENTION

Biaxially oriented multi-layered bottles may be manufactured from plastic materials such as, for example, polyethylene terephthalate (PET) using a hot preform process, wherein a multi-layered perform is heated to its desired orientation temperature and drawn and blown into conformity with a surrounding mold cavity. The multi-layered preform may be prepared by any conventional process such as, for example, by coinjecting a preform comprising multiple layers of plastic or by injecting subsequent layers of plastic over a previously injection molded preform, known as overmolding. Generally, multiple layers are used for food or carbonated beverage containers, to improve the oxygen or carbon dioxide diffusion barrier properties of the overall package.

The various layers of plastics in the prior art multi-layered containers are generally in intimate contact with one another, thereby facilitating the conduction of thermal energy through the walls of the containers. This allows heat energy to be readily transmitted through the container walls to quickly warm to the contents to ambient temperature. Accordingly, such containers may be sheathed in, for example, a foamed polystyrene shell to impart thermal insulating properties to the container.

It would be desirable to prepare a multi-layered container having foamed walls and improved thermal insulating properties.

SUMMARY OF THE INVENTION

Concordant and congruous with the present invention a multi-layered container having foamed walls and improved thermal insulating properties has surprisingly been discovered.

In an embodiment of the invention, a blow molded plastic container including a hollow body and an externally threaded neck providing communication with the hollow body, the container comprises a first layer of plastic suitable for blow molding formed as a foam; a second layer of plastic suitable for blow molding contacting said first layer; a third layer of plastic suitable for blow molding formed as a foam contacting said second layer; a fourth layer of plastic suitable for blow molding contacting said third layer, wherein the hollow body is formed from said first layer, said second layer, said third layer, and said fourth layer of plastic.

In another embodiment of the invention, a blow molded plastic container including a hollow body and an externally threaded neck providing communication with the hollow body, the container comprises a first layer of plastic suitable for blow molding formed as a foam; a second layer of plastic suitable for blow molding contacting said first layer; a third layer of plastic suitable for blow molding formed as a foam contacting said second layer; a fourth layer of plastic suitable for blow molding contacting said third layer; and a fifth layer of plastic suitable for blow molding formed as a foam contacting said fourth layer, wherein the hollow body is formed from said first layer, said second layer, said third layer, said fourth layer, and said fifth layer of plastic.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

An embodiment of the invention is directed to a container comprising a first layer of plastic and a second layer of plastic contacting the first layer, the second layer of plastic formed as a foam wherein the foam cells contain carbon dioxide or nitrogen.

The first and second layers of plastic may be the same or different, in composition, thickness, orientation, etc. The invention contemplates a container having any number (greater than one) of layers of plastics, as long as at least one of the plastic layers is formed as a foam. The invention contemplates the use of a cellular foam plastic layer wherein at least some of the foam cells contain a plurality of gasses.

In another embodiment of the invention, the container includes five layers: a first foamed layer formed adjacent to a first unfoamed plastic layer; a second foamed layer disposed between the unfoamed plastic layer and a second unfoamed plastic layer; and a third foamed layer formed adjacent to the second unfoamed plastic layer. In short, the layers of the container are foamed, unfoamed, foamed, unfoamed, foamed, respectively.

Suitable plastics from which the first and/or second plastic layers may be prepared include, but are not necessarily limited to, polyesters, acrylonitrile acid esters, vinyl chlorides, polyolefins, polyamides, and the like, as well as derivatives, blends, and copolymers thereof. A preferred plastic for one or both of the plastic layers is PET.

In addition to carbon dioxide, the foam cells may contain other gases typically used in processes for making cellular foam structures, including nitrogen, argon, and the like. Preferably, the amount of carbon dioxide present in the foam cells may typically be from about four percent to about eight percent by mass of the preform and possibly up to ten percent by mass of the preform. The foam layer acts as an effective thermal insulator, to retard the conduction of heat energy to or from the atmosphere to or from the heated or chilled beverage within the container.

The multi-layered container may be produced from a multi-layered preform having a corresponding number of layers by conventional blow molding techniques. The cellular foam plastic layer may be prepared coextensively with the other plastic layer by, for example, a coextrusion process; or the first plastic layer may be applied to or received by the foam plastic layer in a multi-step injection molding process. The multi-layered container may include any number of foamed and unfoamed layers, as desired. If the multi-layer configurations described herein are injected overmolded over a pre-made plastic preform, the multilayer preform and resulting multilayer container will have an additional layer. That is, the two layer container will have a third layer, the four layer container will have a fifth layer, and the five layer container will have a sixth layer. The pre-made preform may be formed as a foam or may be unfoamed, as desired. If the pre-made preform is unfoamed, a threaded finish formed at an end of the preform will have not have the same visual appearance as a hollow body of the container, which has a foamed layer. For example, an overmolded container may include an unfoamed first layer of plastic contacting a second layer of plastic formed as a foam. The second layer of plastic contacting an unfoamed third layer of plastic. The first layer, second layer, and third layer of plastic overmolded over a premade preform formed from all unfoamed plastic. A container formed from the four layer overmolded container would have a hollow body formed from the first layer, the second layer, the third layer, and the fourth layer, and an externally threaded neck of the container would be formed from the fourth layer. Alternatively, the externally threaded neck could be formed from the first layer, the third layer, or the first and third layers.

In forming an overmolded preform having a foamed wall and including a hollow body and an externally threaded neck providing communication with the hollow body, according to an embodiment of the invention, first a polymer melt is injection molded to form a first portion of the preform. The first portion of the preform is allowed to cool to a temperature below the polymer softening temperature thereof. The injection molding step is repeated to form a second portion of the polymer preform over, and in intimate contact with, the first portion of the polymer preform. The second portion of the preform is allowed to cool to a temperature below the polymer softening temperature thereof. One of the first portion and the second portion is formed from a polymer melt having a non-reactive gas entrained therein. The entrained gas is caused to open to form a first layer of plastic suitable for blow molding formed as a foam, a second layer of plastic suitable for blow molding contacting the first layer, a third layer of plastic suitable for blow molding formed as a foam contacting the second layer, a fourth layer of plastic suitable for blow molding contacting the third layer; and a fifth layer of plastic suitable for blow molding contacting the fourth layer, wherein the hollow body is formed from the first layer, the second layer, the third layer, the fourth layer, and the fifth layer of plastic. The other of the first portion and the second portion of the preform is formed from an unfoamed plastic suitable for blow molding. Once the first portion and the second portion for the preforms have cooled, the preform may be reheated and blow molded to form a container having a foamed wall.

In preparing the preform, polymer flakes are melted in a conventional plasticizing screw extruder, to prepare a homogeneous stream of hot polymer melt at the extruder discharge. Typically, the temperature of the polymer melt stream discharged from the extruder ranges from about 225 degrees Centigrade to about 325 degrees Centigrade. One ordinarily skilled in the art will appreciate that the temperature of the polymer melt stream will be determined by several factors, including the kind of polymer flakes used, the energy supplied to the extruder screw, etc. As an example, PET is conventionally extruded at a temperature from about 260 degrees Centigrade to about 290 degrees Centigrade. A nonreactive gas is injected under pressure into the extruder mixing zone, to ultimately cause the entrapment of the gas as microcellular voids within the polymer material. By the term "non-reactive gas", as used herein, is meant a gas that is substantially inert in relation to the polymer. Preferred non-reactive gases include carbon dioxide, nitrogen, and argon, as well as mixtures of these gases with each other or with other gasses.

It is well-known that the density of amorphous PET is 1.335 grams per cubic centimeter. It is also known that the density of PET in the melt phase is about 1.200 grams per cubic centimeter. Thus, if the preform injection cavity is filled completely with molten PET and allowed to cool, the resulting preform would not exhibit the proper weight and would have many serious deficiencies, such as sink marks. The prior art injection molding literature teaches that, in order to offset the difference in the densities of amorphous and molten PET, a small amount of polymer material must be added to the part after the cavity has been filled and as the material is cooling. This is called the packing pressure. Thus, about ten per cent more material must be added during the packing pressure phase of the injection molding cycle in order to insure that a preform made by injection molding is filled adequately and fully formed. The packing pressure phase of the injection molding operation is likewise used for polymer materials other than PET.

To form a polymer preform having at least one foamed layer, the polymer preform is typically injection molded into a mold and simultaneously foamed using a non-reactive gas. The gas is entrained in the material during the injection phase. Contrary to the prior art injection molding process, wherein additional polymer material is injected during the packing phase, the present invention utilizes minimized packing pressure. As the polymer material is still in a molten state, the partial pressure of the non-reactive gas is sufficient to permit the release of the dissolved gas from the polymer into the gas phase where it forms a microcellular foam structure. Thus, the preform made by the inventive process weighs less than, but has the same form and geometry as, the polymer preforms produced by the conventional injection molding operations that employ the packing process.

According to the present invention, the polymer melt is injection molded and simultaneously foamed using a non-reactive gas, but the partial pressure of the non-reactive gas is sufficient to facilitate the formation of an open cell foam layer of plastic adjacent to the inner surfaces of the mold. Contrary to the prior art injection molding process wherein additional polymer material is injected during the packing phase, the present invention utilizes minimized packing pressure. To facilitate the formation of the open cell foam layer, the partial pressure of the non-reactive gas is sufficient to permit the release of the dissolved gas in the polymer melt adjacent to the inner surfaces of the mold from the polymer into the gas phase. An unfoamed plastic layer is typically formed adjacent to the open cell foam layer. However, the partial pressure of the non-reactive gas may also be sufficient to permit the release of the dissolved gas from the polymer into the gas phase to form a layer of closed cell foam adjacent to the open cell foam layer.

The resulting preform formed by the injection molding process described herein may include any number of foamed and unfoamed layers, but typically includes five layers as described herein. As described in more detail below, the preform is blow molded to form a container having the same number of layers as the blow molded preform.

Upon completion of the injection molding step, the preform is cooled to a temperature below the polymer softening temperature. The softening temperature for PET is approximately 70 degrees Centigrade. Thus, the entrapped non-reactive gas is retained within the walls of the polymer preform. The cooling step is critical to the inventive process, as it conditions the polymer and preserves the desirable properties for the successful preparation of a blow molded container. The cooling step is also necessary when employing polymers such as polyesters, which cannot be easily blow molded directly from an extruded parison. The cooling step may be effected by any conventional process used in the polymer forming art such as, for example, by passing a stream of a cooling gas over the surfaces of the preform, or cooling the preform while in-mold by cooling the associated forming mold.

The preform is thereafter reheated to a temperature above the polymer softening temperature. The heating step may be effected by well-known means such as, for example, by exposure of the preform to a hot gas stream, by flame impingement, by exposure to infra-red energy, by passing the preform through a conventional oven, or the like. PET is generally reheated to a temperature twenty to twenty-five degrees above a softening temperature for the subsequent blow molding operation. If PET is reheated too far above its glass transition temperature, or held at a temperature above its softening temperature for an excessive period of time, the PET undesirably will begin to crystallize and turn white. Likewise, if the preform is heated to a temperature above which the mechanical properties of the material are exceeded by the increasing pressure of the non-reactive gas in the microcells, the microcells undesirably will begin to expand thus distorting the preform.

Finally, the preform is blow molded, to prepare a container, consisting essentially of a five layer container including an outer open cell microcellular foamed layer, an inner open cell microcellular foamed layer, and having a closed cell microcellular foamed layer formed between unfoamed plastic layers formed therebetween. Methods and apparatus for blow molding a container from a polymer preform are well-known.

In another embodiment of the invention, a container having at least one foamed layer adjacent to an unfoamed layer further includes a barrier layer adapted to minimize the permeation of oxygen through the wall of the container. The barrier layer may be blend of the material forming a single layer of the container, or the barrier layer may be a barrier material blended with a plurality of layers of the container. The barrier layer or barrier material blend may be formed from a material containing an oxygen scavenger, for example oxygen scavenger barrier material including nylons sold under the trademarks DiamondClear® by Constar; Oxbar® by Constar; MonOxbar® by Constar; Bind-Ox™ by AMCOR; Polyprotect™ M&G; Polyshield® by Invista. The barrier material may be forced from a material having an oxygen scavenger that is not nylon, such as materials sold under the trademarks Amosorb® by ColorMatrix; HyGuard™ by ColorMatrix; Valor® by Valspar, for example.

The container may also include a barrier layer adapted to minimize the permeation of carbon dioxide ($CO_2$) through the wall of the container. The barrier layer may be a single layer of the container blended with the material having barrier layer properties, such as a layer formed from polyethylene naphthalate (PEN) or a nanocomposite clay material, such as materials sold under the trademarks, such as sold under the trademark Aegis HFX & OX™ by Honeywell; Imperm® by AMCOL; and Aegis® by Honeywell, for example. Alternatively, the barrier layer may be a barrier material blended with a plurality of layers of the container. It is understood that the container including materials adapted to minimize the permeation of oxygen and carbon dioxide may have any number of foamed and unfoamed layers, such as a three-layer container, a four-layer container, a five-layer container, and a six-layer container similar to the containers described herein.

One ordinarily skilled in the art will readily appreciate that the number and types of plastic layers used, and the various means, chemical and physical, used to produce an open cell foam layer and a closed cell foam layer, can be varied over wide limits to produce a variety of contemplated multi-layered containers and preforms, utilizing the present invention. Furthermore, each of the containers and preforms of the embodiments disclosed herein include a hollow body formed by the plastic layers and an externally threaded neck, also known as a finish, adapted to receive a corresponding closure providing fluid communication with the hollow body. The hollow body is formed from the various layers of plastic described in each embodiment, and the threaded finish may be formed from one or more of the various layers of plastic as described in each embodiment. The plastic layer(s) forming the hollow body, including a base, and the plastic layer(s) forming the threaded finish may be referred to collectively as the wall(s) or the sidewall(s) of the container or preform.

From the foregoing description, one ordinarily skilled in the art can easily ascertain the essential characteristics of this invention and, without departing from the spirit and scope thereof, can make various changes and modifications to the invention in accordance with the appended claims.

We claim:

1. A blow molded plastic container including a hollow body and an externally threaded neck providing communication with the hollow body, the container made by a process comprising:

heating a preform to a softening temperature, the preform comprising a first layer of foamed plastic, a second layer of unfoamed plastic contacting the first layer, a third layer of foamed plastic contacting the second layer, a fourth layer of unfoamed plastic contacting the third layer, and a fifth layer of foamed plastic contacting the fourth layer; and blow molding the heated preform to form a container comprising the first layer of foamed plastic with a porosity consisting of open cells, the second layer of unfoamed plastic, the third layer of foamed plastic with a porosity consisting of closed cells, the fourth layer of unfoamed plastic, and the fifth layer of foamed plastic as a foamed layer.

2. The container of claim 1, wherein the fifth layer of plastic of the container is an inner open cell foamed layer.

3. The container of claim 1, wherein the preform further comprises a sixth layer of unfoamed plastic contacting the fifth layer, the container further comprises the sixth layer of unfoamed plastic, and the fifth layer of foamed plastic of the container is a closed cell foamed layer.

4. The container of claim 3, wherein the externally threaded neck is formed from the sixth layer.

5. The container of claim 1, wherein the externally threaded neck is formed from the first, second, third, fourth, and fifth layers.

6. The container of claim 1, wherein at least one of the first, second, third, fourth, and fifth layers comprises a barrier layer comprising a material adapted to minimize the permeation of oxygen.

7. The container of claim 1, wherein at least one of the first, second, third, fourth, and fifth layers comprises a barrier layer comprising an oxygen scavenger.

8. The container of claim 1, wherein at least one of the first, second, third, fourth, and fifth layers comprises a barrier layer comprising a material adapted to minimize the permeation of carbon dioxide.

9. The container of claim 1, wherein the container consists essentially of the first layer of foamed plastic with a porosity consisting of open cells, the second layer of unfoamed plastic, the third layer of foamed plastic with a porosity consisting of closed cells as a closed cell foamed layer, the fourth layer of unfoamed plastic, and the fifth layer of foamed plastic as an inner open cell foamed layer.

10. The container of claim 1, wherein the third layer of foamed plastic includes foam cells comprising carbon dioxide.

11. The container of claim 10, wherein the foam cells comprise up to ten percent by mass of the preform.

12. The container of claim 1, wherein the third layer of foamed plastic includes foam cells comprising nitrogen.

13. The container of claim 1, wherein the first, second, third, fourth, and fifth layers each comprises polyethylene terephthalate.

14. The container of claim 1, wherein the preform is made by a process comprising:
  injection molding a polymer melt to form a first portion of the preform;
  cooling the first portion of the preform to a temperature below the polymer softening temperature;
  repeating the injection molding step to form a second portion of the preform over and in intimate contact with the first portion of the preform; and
  cooling the second portion of the preform to a temperature below the polymer softening temperature;
wherein:
one of the first portion and the second portion is formed from a polymer melt having a non-reactive gas entrained therein, the entrained gas caused to nucleate to form the first layer of foamed plastic, the second layer of unfoamed plastic contacting the first layer, the third layer of foamed plastic contacting the second layer, the fourth layer of unfoamed plastic contacting the third layer, and the fifth layer of foamed plastic contacting the fourth layer;
the hollow body is formed from the first layer, the second layer, the third layer, the fourth layer, and the fifth layer of plastic; and
the other of the first portion and the second portion is formed from an unfoamed plastic.

* * * * *